June 26, 1934.　　　J. W. NESBITT　　　1,964,671
METHOD OF RENDERING METAL SELF LUBRICATING
Filed Aug. 19, 1932
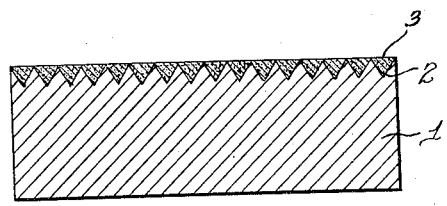
INVENTOR
James W. Nesbitt
BY
ATTORNEYS

UNITED STATES PATENT OFFICE 1,964,671

METHOD OF RENDERING METAL SELF-LUBRICATING

James W. Nesbitt, Detroit, Mich.

Application August 19, 1932, Serial No. 629,501

4 Claims. (Cl. 308—241)

The present invention pertains to a novel method of smoothing the surface of metal and converting the same into a partial self-lubricating condition. The method is applicable especially to metal surfaces that move relatively to each other and in contact with each other, or in other words, to surfaces of machine parts which ordinarily must be worn in and then lubricated.

In its smoothing effect on metal surfaces, the present method is comparable to honing in that it is desired to eliminate the usual initial wear and to reduce the detrimental effects of oil dilution. The present method, however, excels honing with regard to the smoothness of surface produced.

The method embodying this invention includes the filling of the pores of the metal, at the surface, with a semi-solid lubricant and the lubricant is applied in the form of a fluid containing lubricating material such as graphite. Mica may also be used if necessary or desired, as the lubricating material, or a mixture of graphite and mica may be used. The liquid may be an oil or other fluid lubricant, and castor-oil has been found quite satisfactory in this connection. In fact, colloidal graphited castor-oil known under the trade-name of "Castordag" has been found quite satisfactory for the purpose. This material is a suspension of ten parts of graphite in ninety parts of castor-oil. The oil functions as a lubricant and carrier for solid lubricant particles during the impacting and burnishing process presently to be described, and holds the graphite in suspension during this process.

The fluid carrying solid lubricating particles is applied to the surface being treated, preferably under high pressure and the particles carried thereby are forced into the irregularities of said surface by an impacting action, as by an intermittent hammering force against the surface treated. The surface is burnished at the same time by a rubbing action and this is accompanied by an intermittent impacting or hammering action which forces the solid lubricant particles into the irregularities of the metal surface. In other words there is a hard rubbing of the metal surface to burnish said surface, and with the fluid preferably under a high pressure varying from fifty pounds to one thousand pounds per square inch according to the surface being treated, and with a simultaneous intermittent impact pressure against said surface sufficient to drive the solid lubricant particles into and fill the pores of the metal surface, thus together giving a perfectly smooth surface impregnated with solid lubricant particles.

The accompanying drawing illustrates on a magnified scale the effects of the process. The machined surface of a piece of metal 1 has grooves, marks, scratches, or threads 2 made by the machine tool and which vary in depth according to the operation performed on the metal, whether it be boring, grinding, honing or the like. The initial wear of this surface in service consists in cutting down the walls of the markings until the surface is nearly perfectly smooth. This process is called wearing-in or taking out the initial wear. Obviously, it results in increased clearance between the relatively movable surfaces. Further, the metal particles removed from the surface during the wearing-in pass into and are circulated with the lubricating oil and further mar and wear away the surfaces when carried therebetween with the oil.

The method of the present invention fills the threads or grooves 2 as indicated by the numeral 3 and also the pores of the metal with solid lubricating particles and simultaneously burnishes the surface so that a perfectly smooth self lubricated surface is obtained.

For the purpose of this invention, the lubricating particles in suspension in the fluid lubricant are applied to the metal bearing surface by means of a machine of any suitable construction adapted to apply a fluid to the bearing surface, such as the wall of a bore, under high pressure and including instrumentalities adapted to be intermittently vibrated to impart a series of rapid hammering blows to the surface, and at the same time burnish the wall of the bore by a high rotary intermittently applied force. Special machines may be designed for special shapes in order to apply the lubricant with such hard impacting and burnishing action. The present method is obviously applicable to all kinds of bearing surfaces.

It will now be evident that, by means of the process of this invention, the ultimate clearance between two bearing surfaces may be considerably reduced owing to the fact that the usual wearing-in of the surfaces is eliminated. Moreover, although it is intended that the parts be lubricated in the usual manner, they are partially self-lubricating, so that if the circulating oil supply is exhausted or lost through a leaking oil line, the machine may run for a substantial period of time without burning out the bearings. In this period of time, it is very likely that the depletion of oil will be discovered.

The method herein set forth is susceptible of modification within the scope of the appended claims and such changes are contemplated.

What I claim is:

1. The method of rendering a metal bearing surface self-lubricating which consists in permanently filling the irregularities of said surface with solid particles of lubricating material by a hammering force.

2. The method of rendering a metal bearing surface self-lubricating which consists in forcing into and permanently filling the irregularities of said surface with solid lubricant particles by an intermittent impacting force.

3. The method of rendering metal bearing surfaces partially self lubricating which method consists in intermittently applying to the surface a fluid containing solid lubricant particles in suspension and forcing said solid particles into the irregularities of said surface to permanently fill the same by an intermittent hammering force.

4. The method of rendering metal bearing surfaces self-lubricating, which method consists in intermittently applying a fluid containing solid particles, hammering into and permanently filling the irregularities of said surface with said particles by an intermittent hammering impact of high frequency and burnishing the surface so filled, by a high rotary intermittently applied force.

JAMES W. NESBITT.